(12) United States Patent
Campbell

(10) Patent No.: US 6,593,879 B1
(45) Date of Patent: Jul. 15, 2003

(54) USING THE GLOBAL POSITIONING SATELLITE SYSTEM TO DETERMINE ATTITUDE RATES USING DOPPLER EFFECTS

(75) Inventor: Charles E. Campbell, Laurel, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/928,700

(22) Filed: Aug. 9, 2001

Related U.S. Application Data

(60) Provisional application No. 60/225,030, filed on Aug. 10, 2000.

(51) Int. Cl.$^7$ .............................. H04B 7/185; G01S 5/02
(52) U.S. Cl. ............................. 342/357.11; 342/357.05; 701/215
(58) Field of Search ........................ 342/357.05, 357.11; 701/215

(56) References Cited

U.S. PATENT DOCUMENTS

| | | |
|---|---|---|
| 5,101,356 A | 3/1992 | Timothy et al. |
| 5,185,610 A | 2/1993 | Ward et al. |
| 5,268,695 A | 12/1993 | Dentinger et al. |
| 5,525,998 A | 6/1996 | Geier |
| 5,543,804 A | 8/1996 | Buchler et al. |
| 5,561,432 A | 10/1996 | Knight |
| 5,757,316 A | 5/1998 | Buchler |
| 5,844,521 A | 12/1998 | Stephens et al. |
| 5,917,445 A | 6/1999 | Schipper et al. |
| 5,928,309 A | 7/1999 | Korver et al. |
| 5,933,110 A | 8/1999 | Tang et al. |
| 5,990,827 A | 11/1999 | Fan et al. |
| 6,005,514 A | 12/1999 | Lightsey |
| 6,078,284 A | 6/2000 | Levanon |
| 6,101,430 A | 8/2000 | Fuller et al. |
| 6,133,874 A | 10/2000 | Krasner |
| 6,266,582 B1 | 7/2001 | Bruckner |

OTHER PUBLICATIONS

Development and Flight Demonstration of a GPS Receiver for Space Edgar G. Lightsey, UMI Dissertation Services, Feb. 1997.

*Primary Examiner*—Theodore M. Blum
(74) *Attorney, Agent, or Firm*—Bryan Geurts

(57) ABSTRACT

In the absence of a gyroscope, the attitude and attitude rate of a receiver can be determined using signals received by antennae on the receiver. Based on the signals received by the antennae, the Doppler difference between the signals is calculated. The Doppler difference may then be used to determine the attitude rate. With signals received from two signal sources by three antennae pairs, the three-dimensional attitude rate is determined.

6 Claims, 2 Drawing Sheets

USING THE GLOBAL POSITIONING SATELLITE SYSTEM TO DETERMINE ATTITUDE RATES USING DOPPLER EFFECTS

This application claims priority to U.S. Provisional Patent Application No. 60/225,030, filed Aug. 10, 2000.

ORIGIN OF THE INVENTION

The invention described herein was made by an employee of the United States Government, and may be manufactured and used by or for the Government for governmental purposes without the payment of any royalties.

The present invention is drawn to determining the attitude and attitude rate of a receiver using signals from the Global Positioning System (GPS) and calculating the Doppler difference between signals using multiple antennae on a receiver.

BACKGROUND

Global Positioning System devices typically use a phased-locked-loop to track the frequency of GPS satellites. The phase-locked-loop contains a "P" (proportional to error) and a "D" (proportional to error rate) term, the latter term being used to infer attitude rates. GPS attitude rate determination using the "D" term of the phase-locked-loop is noisy. To get any useful information from it, the data has to go through a low-pass filter. This latter operation limits the high-frequency (high rates) that the system can handle.

Alternatively, different devices, such as gyroscopes may be used. A variety of position-determining devices can be used in conjunction with numerical differentiation to yield satellite attitude rates such as star trackers and digital sun sensors. Gyroscopes are very accurate, but are yet another device for the satellite to carry. Also, numerically differentiating attitude-determination is inherently a very noisy operation.

The following patents teach attitude or attitude rate determinations using various methods: U.S. Pat. Nos. 5,101,356; 5,185,610; 5,525,998; 5,268,695; 5,543,804; 5,561,432; 5,757,316; 5,844,521; 5,917,445; 5,933,110; 5,928,309; 5,990,827; 6,101,430; 6,005,514; 6,078,284; 6,133,874; 6,266,582; and "Development and Flight Demonstration of a GPS Receiver for Space" Dissertation by Edgar Glenn Lightsey. All of the above references are hereby incorporated by reference.

The present invention handles both high and low frequency attitude rate determination with high accuracy, for example, a zero crossing vector could be couple with a quartz-based counter, thereby yielding long period estimations to within microseconds). Using Doppler difference to determine attitude rate can replace the need for a gyroscope, thereby allowing cheaper attitude rate determination. Cheaper systems could use GPS-only for positioning, attitude and attitude rate.

SUMMARY OF THE INVENTION

The invention is drawn to determining the attitude and attitude rate of a receiver based on signals received by antennae on the receiver. Based on the signal received by the antennae, the Doppler difference between the signals is calculated. With signals received from two signal sources by three antennae pairs, the three-dimensional attitude rate is determined.

DETAILED DESCRIPTION

Consider two antennae 1 and 2 on a receiver 3 and the signals they receive from one GPS satellite 10. If the two antennae are fixed relative to the GPS satellite, and ignoring effects such as multipath, they receive the same signal slightly phase shifted due to their separation. If the two antennae are rotated about the receiver centroid 4 between them, there will be a shift in frequency between the two signals due to the Doppler effect. One may extract the difference frequency by passing the two signals through a multiplier:

$$\sin \omega_1 t \hat{X} \sin \omega_2 t = -\tfrac{1}{2} \cos[(\omega_1+\omega_2)t] + \tfrac{1}{2} \cos[(\omega_1-\omega_2)t]$$

The sum of frequencies term is extremely high since GPS is broadcasting at gigahertz frequencies. Consequently, a low pass filter designed to remove it would easily allow megahertz rotation rates to be determined. The low frequency term is related to the rotation of the two antennae about their common centroid. This approach also requires cross-correlation with the pseudo-random noise (PRN) code of the GPS space vehicle under consideration, suitably phase shifted. This signal is already available on GPS receivers to support their tracking and acquisition functions.

Figure 1:
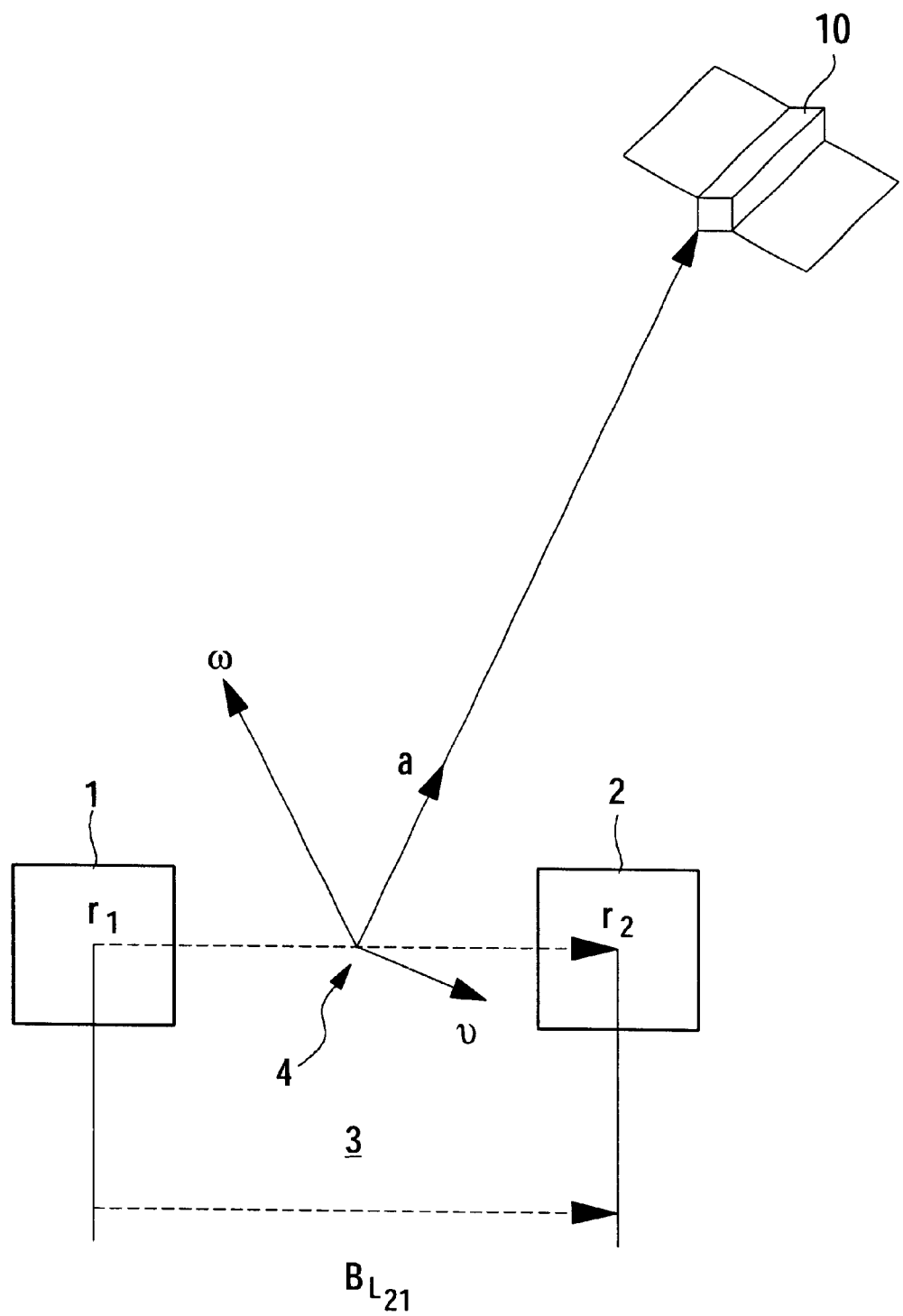
FIG. 1 shows a system with one GPS satellite and two antennae.

Equations 1–4 refer to FIG. 1, and define some basic variables and vectors which relate the antennae to a GPS satellite.

$$r = \tfrac{1}{2} \|BL_{21}\| \tag{1}$$

$$v_1 = v - \omega X\, r_1 \tag{2}$$

$$v_2 = v - \omega X\, r_2 \tag{3}$$

$$v_2 - v_1 = 2\omega X(r_2 - r_1) \tag{4}$$

where r is the vector $r_2 - r_1$ $r_1$ is the vector from the centroid of the receiver to antenna 1

$r_2$ is the vector from the centroid of the receiver to antenna 2

$BL_{21}$ is the distance between antenna 1 and antenna 2 v is the velocity of the receiver relative to the GPS satellite

ω is the angular velocity vector for the satellite $v_1$ is the velocity of antenna 1 relative to the GPS satellite $v_2$ is the velocity of antenna 2 relative to the GPS satellite a is the centroid of the receiver to GPS satellite normal vector Subtracting the two signals eliminates the common velocity, leaving a velocity dependent on the baseline vector between the two antennae and the angular velocity.

$$f_r = f_t(1 - v \cdot a/c) \tag{5}$$

$$f_{r1} = f_t(1 - ((v - \omega X\, r_1) \cdot a)/c) \tag{6}$$

$$f_{r2} = f_t(1 - ((v + \omega X\, r_2) \cdot a)/c) \tag{7}$$

$$f_{r1} - f_{r2} = f_t(\omega X(r_1 - r_2))/c \tag{8}$$

v is the velocity from the GPS satellite to the receiver a is the unit vector pointing from the receiver to the GPS satellite $f_r$ is frequency of the signal received by the antenna $f_t$ is the transmitted frequency of the signal from the GPS satellite $f_{r1}$ is the modified frequency at $r_1$ $f_{r2}$ is the modified frequency at $r_2$ c is the speed of light Equation 5 is the standard Doppler equation. Equation 8 relates the three unknown variables in the ω vector to the scalar difference frequency. Multiple satellites can be used to form a simultaneous set of three equations as is well-known, however, due to r, only the component of ω normal to r can be determined. To get the complete ω, three non-collinear antennae are required. Then three simultaneous, linear, independent equations are formed in various ways, using two satellites and two pairs of antennae.

Figure 2:
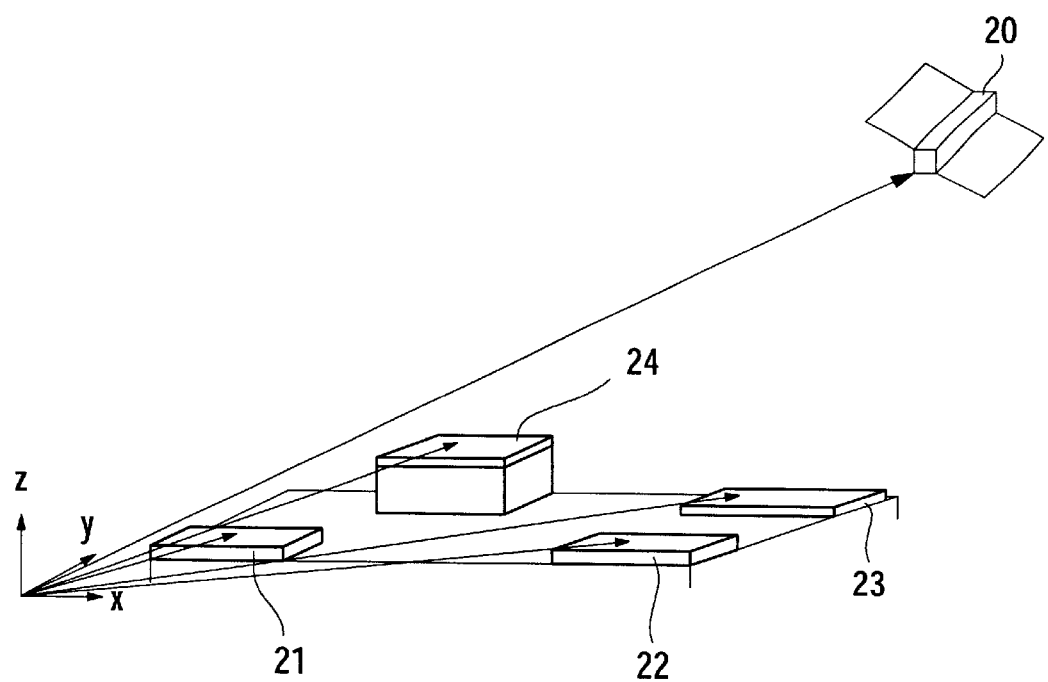
FIG. 2 shows a system with one GPS satellite and four antennae.

FIG. 2 shows a four-antenna array. Atennae 21–23 must not be coplanar with antenna 24. The one satellite 20 and four-antenna array permit angular rate determination in the plane normal to the direction of propagation of its signal. In order to yield full three-dimensional determination of attitude rate two satellites (not collinear nor parallel with respect to the four antennae array) need to be used.

The invention has been described using GPS signals as the signal source, however any other appropriate signal source may be used. Also, minimum means squared estimate and other known methods may be used to further reduce noise effects on attitude rate estimation.

I claim:

1. A method of determining the attitude rate of a receiver comprising:

sending a first signal from a first signal source;

receiving the first signal with a first antenna on a receiver;

receiving the first signal with a second antenna on the receiver;

sending a second signal from a second signal source;

receiving the second signal with the first antenna;

receiving the second signal with the second antenna;

receiving the first signal with a third antenna on the receiver;

receiving the second signal with the third antenna;

determining the Doppler difference between the first signal and the second signal; and determining a component of the attitude rate based on the Doppler difference between the first signal and second signal, wherein the first, second and third antennae are non-collinear.

2. The method of claim 1, wherein the first signal source is a first Global Positioning System satellite.

3. The method of claim 1, further comprising:

sending a second signal from a second signal source;

receiving the second signal with the first antenna;

receiving the second signal with the second antenna;

receiving the first signal with a third antenna on the receiver;

receiving the second signal with the third antenna;

receiving the first signal with a fourth antenna on the receiver;

receiving the second signal with the fourth antenna;

determining the Doppler difference from the received signals;

determining the attitude rate based on the Doppler difference between all of the received signals.

4. The method of claim 3, wherein the second signal source is a second Global Positioning System satellite.

5. The method of claim 3, wherein the first, second, third and fourth antennae are non-collinear and the fourth antennae is non-coplanar with the first second and third antennae.

6. A method of determining the attitude rate of a receiver comprising:

sending a first signal from a first signal source;

sending a second signal from a second signal source;

receiving the first signal with a first antenna on a receiver;

receiving the second signal with the first antenna;

receiving the first signal with a second antenna on the receiver;

receiving the second signal with the second antenna;

receiving the first signal with a third antenna on the receiver;

receiving the second signal with the third antenna;

receiving the first signal with a fourth antenna on the receiver;

receiving the second signal with the fourth antenna;

determining the Doppler difference between the received signals;

determining the three-dimensional attitude rate based on the Doppler difference between all of the received signals.

* * * * *